(12) United States Patent
Steiner et al.

(10) Patent No.: US 7,618,251 B2
(45) Date of Patent: Nov. 17, 2009

(54) DEVICE FOR PROCESSING AN EDIBLE PRODUCT

(75) Inventors: Uwe Steiner, Nümbrecht (DE);
Karl-Jürgen Kasemann, Meinerzhagen (DE); Michael Paul, Bergneustadt (DE)

(73) Assignee: Buhler AG, Uzwil (CH)

( * ) Notice: Subject to any disclaimer, the term of this patent is extended or adjusted under 35 U.S.C. 154(b) by 188 days.

(21) Appl. No.: 11/883,566

(22) PCT Filed: Nov. 3, 2005

(86) PCT No.: PCT/IB2005/053587
§ 371 (c)(1),
(2), (4) Date: Oct. 23, 2007

(87) PCT Pub. No.: WO2006/095220
PCT Pub. Date: Sep. 14, 2006

(65) Prior Publication Data
US 2008/0311237 A1    Dec. 18, 2008

(30) Foreign Application Priority Data
Feb. 1, 2005    (DE) .................. 10 2005 004 785

(51) Int. Cl.
*A23P 1/10*    (2006.01)

(52) U.S. Cl. .................. 425/256; 222/439; 222/440; 222/450; 425/257; 425/448; 425/449

(58) Field of Classification Search .............. 425/256, 425/257, 448, 449; 222/425, 439, 440, 450
See application file for complete search history.

(56) References Cited

U.S. PATENT DOCUMENTS

| | | | |
|---|---|---|---|
| 3,605,645 A | | 9/1971 | Herrmann |
| 5,718,354 A | * | 2/1998 | Binley ........................ 222/1 |
| 6,161,733 A | | 12/2000 | King |
| 6,534,106 B2 | * | 3/2003 | Cathenaut et al. ........... 426/317 |
| 6,733,256 B1 | * | 5/2004 | Knobel ........................ 222/425 |

FOREIGN PATENT DOCUMENTS

| | | |
|---|---|---|
| EP | 0956777 | 11/1999 |
| EP | 1196044 | 4/2002 |
| EP | 1547469 | 6/2005 |
| WO | WO 94/19963 | 9/1994 |

* cited by examiner

*Primary Examiner*—James Mackey
(74) *Attorney, Agent, or Firm*—Wolff & Samson PC

(57) ABSTRACT

The invention relates to a device for processing an edible product in the form a viscous to pasty mass (1), especially an edible product based on a fat mass, such as chocolate, or based on water, such as ice cream. Said device comprises a dosing unit (2) for the dosed delivery of a specific volume of the mass (1) to shaping units (13). The movement of the displacement element (6) determining the dosage volume is performed via servo drive (9) while an inlet (4) and an outlet (5) are closed and opened via servo drive or pneumatic drive, respectively. Preferably, the displacement element is embodied as a combined lifting/rotating plunger (6) which can perform a linear movement for a suctioning lift and a dosing lift while being able to perform a rotary movement for opening and closing the inlet (4) and the outlet (5), i.e. a valve function.

14 Claims, 3 Drawing Sheets

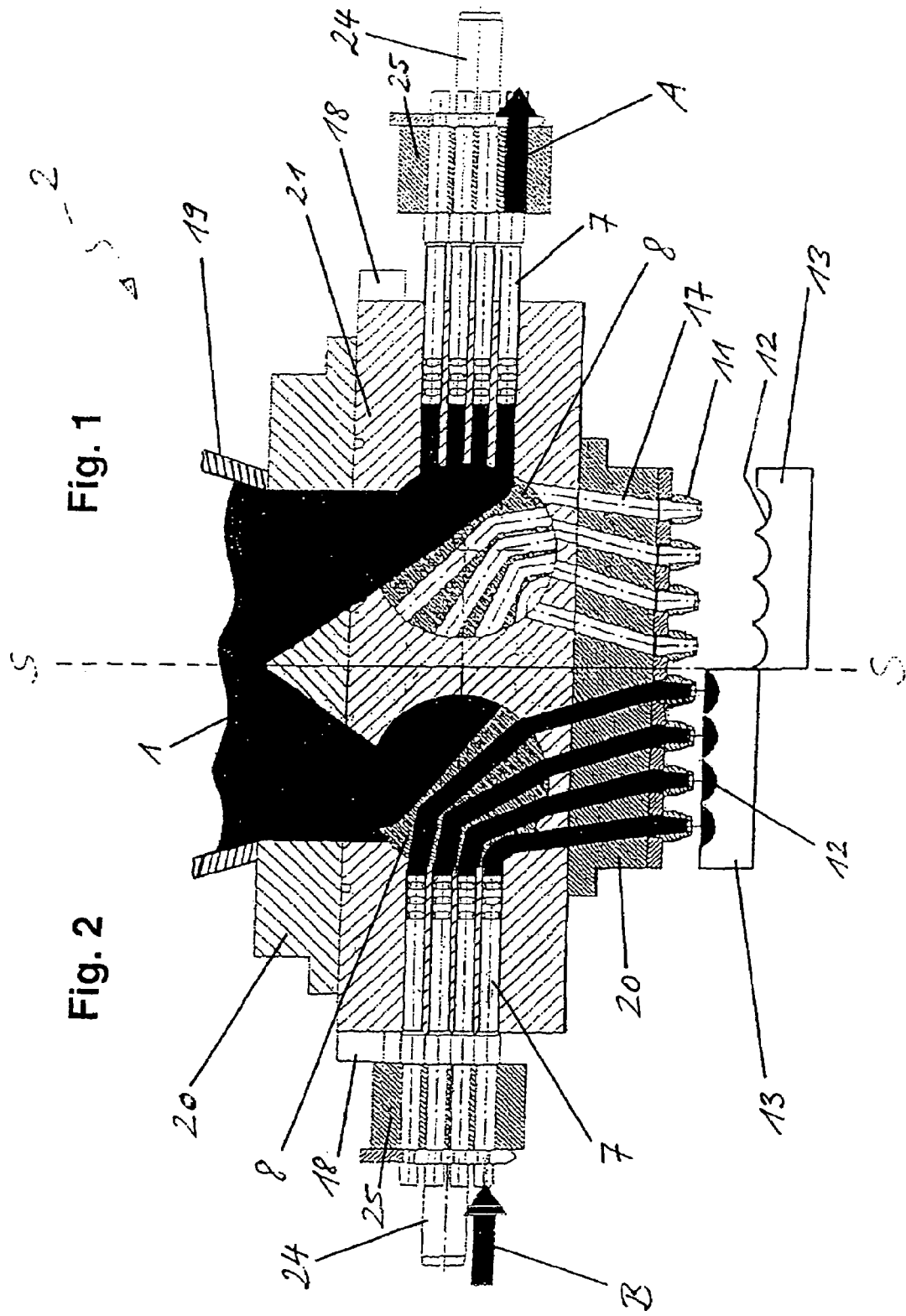

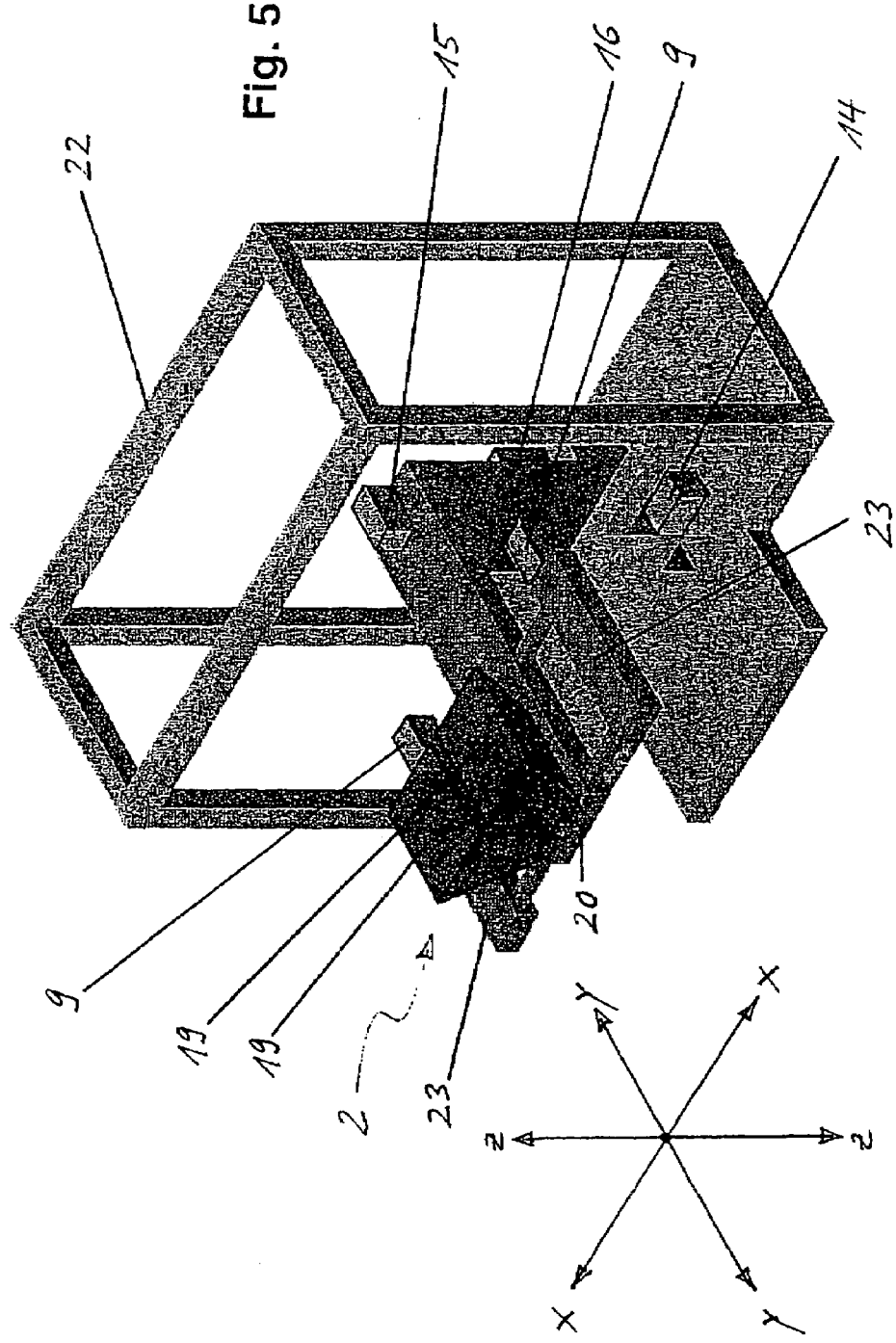

DEVICE FOR PROCESSING AN EDIBLE PRODUCT

This is a U.S. national stage of application No. PCT/IB2005/053587, filed on Feb, 1, 2005. Priority is claimed on that application and on the following application:
Country: Germany, Application No.: DE 10 2005 004 785.8, Filed: Nov. 3, 2005.

BACKGROUND OF THE INVENTION

The invention relates to a device for processing a consumable in the form of a viscous to pasty mass, in particular a consumable based on fat, such as chocolate, or a consumable based on water, such as ice cream, with metering unit for the metered supply of a specific volume of the mass to molding units.

The metering unit has a chamber with a sealable inlet opening and a sealable outlet opening for the mass to be metered, as well as a sealed displacement body that extends into the chamber and can move around therein, which can move between a first setting, at which the outlet opening is closed and the inlet opening is open, and the cavity volume defined between the displacement body and the chamber has its greatest value, and a second setting, at which the inlet opening is closed and the outlet opening is open, and the cavity volume defined between the displacement body and the chamber has its smallest value.

The inlet opening and outlet opening can here be closed by means of an inlet valve or outlet valve.

Defined as a result is a metering volume, which reflects the difference between the greatest value and the smallest value for the cavity volume formed between the displacement body and the chamber.

In the known devices of the design specified at the outset, hydraulic or pneumatic devices are used to power the displacement bodies and valves.

Such a device is disclosed in U.S. Pat. No. 6,161,733 or EP 1 196 044, for example.

The known devices of the design described at the outset are used for processing a food.

However, the use hydraulic drives in processing foods is not entirely without problems, since the hygiene necessary for food processing cannot be readily ensured. For example, the food may become contaminated while being processed if hydraulic oil leaks or a hydraulic line bursts.

The disadvantage to pneumatic drives is that they exhibit a slight rigidity, resulting in shortcomings relating to metering accuracy.

SUMMARY OF THE INVENTION

Therefore, the object of the invention is to provide a device of the kind mentioned at the outset in which overcomes the disadvantage of lacking hygiene in hydraulic drives, or the disadvantage of low stiffness in pneumatic drives for metering purposes.

This object is achieved according to the invention by virtue of the fact that the movement of the displacement body that defines the metering volume in the device described at the outset takes place by means of a preferably electromechanical servo-drive, an the inlet valve and outlet valve are each closed and opened by means of a pneumatic drive, wherein the inlet valve and the outlet valve are each formed by a partial area of the displacement body, which only blocks the outlet opening in the first setting, and only blocks the inlet opening in the second setting.

The device according to the invention hence satisfies the requirements placed on hygiene, and has the stiffness necessary for metering accuracy. The dual function of the displacement body enables a compact design for the device according to the invention that requires a small number of moving components.

The displacement body is preferably a reciprocating piston, which slides axially in the chamber of the metering unit, and can be moved back and forth by means of the servo-drive in the chamber between a first stroke setting in which the cavity volume defined between the reciprocating piston and the chamber has its greatest value, and a second stroke setting in which the cavity volume defined between the reciprocating piston and the chamber has its smallest value.

The inlet valve and the outlet valve are preferably formed by means of a rotating piston that is interspersed with a channel, is rotatably mounted in the chamber of the metering unit, and can be moved back and forth between a first rotation setting and a second rotation setting by means of a drive. The channel in the first rotation setting of the rotating piston here establishes a connection between the cavity volume and the inlet opening. In the second rotation setting of the rotating piston, the channel establishes a connection between the cavity volume and the outlet opening. Similarly to the reciprocating piston, the rotating piston can thereby be moved back and forth in the chamber between the first rotation setting and the second rotation setting.

It is especially advantageous for the displacement body to be a reciprocating/rotating piston, which axially slides in the chamber and can pivot around its longitudinal axis.

The first setting of the reciprocating/rotating piston here consists of a first stroke setting and first rotation setting, while the second setting of the reciprocating/rotating piston is formed by a second stroke setting and second rotation setting.

The axial stroke movement of the reciprocating/rotating piston here best takes place by way of a linear or rotative servo drive, while the rotational movement of the reciprocating/rotating piston best takes place via a linear or rotative pneumatic drive. An inexpensive pneumatic drive is sufficient for actuating the rotational movement, enabling a sufficiently accurate rotational movement of the reciprocating/rotating piston despite its low stiffness, and hence the alternating release and blocking of the inlet opening and outlet opening for the aspiration stroke and metering stroke of the reciprocating/rotating piston.

Preferably used as the drive for the stroke movement of the reciprocating/rotating piston is a rotating servomotor, which is linked with a toothed wheel in a torsionally resistant manner, and generates the axial stroke movement of the reciprocating/rotating piston or the piston by means of a toothed rack, which is linked with the reciprocating/rotating piston in an axially rigid manner so that it can rotate in the rotational direction. Preferably used in this case to drive the rotational movement of the reciprocating/rotating piston is a linear pneumatic cylinder, with which a toothed rack is rigidly connected, meshing with a toothed wheel connected with the reciprocating/rotating piston in a torsionally resistant manner. All reciprocating/rotating pistons can be jointly made to move in the stroke direction, i.e., are in a beam rigidly secured to a toothed rack that winds over a pinion shaft that is in turn connected with the rotative motor.

In a special embodiment, the shaping units each contain a die, through which the specific volume of mass is conveyed, and a contact surface lying opposite the die, which is contacted by the specific volume of mass, wherein the contact surface can be the inner surface of a mold, for example.

The contact surface is here preferably the upper surface of a mold table, which can be traversed along three linearly independent directions by a respective linear servo-drive.

If the die is connected by a flexible fluid line (for transporting the food mass) to the outlet opening of the metering unit, it can be traversed along three linearly independent directions by a respective linear servo-drive instead of or in addition to the traversable mold table.

However, the die can also be rigidly connected with the outlet opening. In this case, the die along with the entire piston/valve unit cam be spatially moved along three independent directions.

It is particularly advantageous for the reciprocating/rotating piston to exhibit a toothed wheel, and for the rotative servo-drive to be replaced by a linear servo-drive or a linear pneumatic drive, which drives a toothed rack that meshes with the toothed wheel. This makes it possible to realize all drives using linear servo-drives and linear pneumatic drives, so that the device can make do with fewer different components, and becomes easier to maintain. Using a linear servo-motor may eliminate the need to combine the toothed wheel and toothed rack entirely, since both the stroke movement and servo drive motion are linear.

The device according to the invention best has a plurality of reciprocating/rotating pistons with a respective toothed wheel, wherein the toothed rack driven by only a single linear servo-drive or only a single pneumatic drive meshes with several toothed wheels of several reciprocating/rotating pistons. This makes it possible to reduce the production and operating costs associated with the device according to the invention.

To enhance the hygiene concept of the invention to the effect that hydraulic drives are unnecessary, thereby precluding a contamination of the product area through hydraulic fluid, a hygiene wall is provided between the drive area and product area in the device according to the invention. This also protects the drive elements of the drive area described further above against contamination by exiting product (fat, chocolate).

BRIEF DESCRPTION OF THE DRAWINGS

Other advantages, features and potential applications of the device according to the invention may be gleaned from the specification below based on the drawing, wherein:

FIG. 1 shows a sectional view of a metering unit of prior art during the aspiration phase;

FIG. 2 shows a sectional view of a metering unit of prior art during the metering phase;

FIG. 5 shows a diagrammatic perspective view of the entire device according to the invention with metering unit.

DETAILED DESCRIPTION OF THE INVENTION

Figure 3:
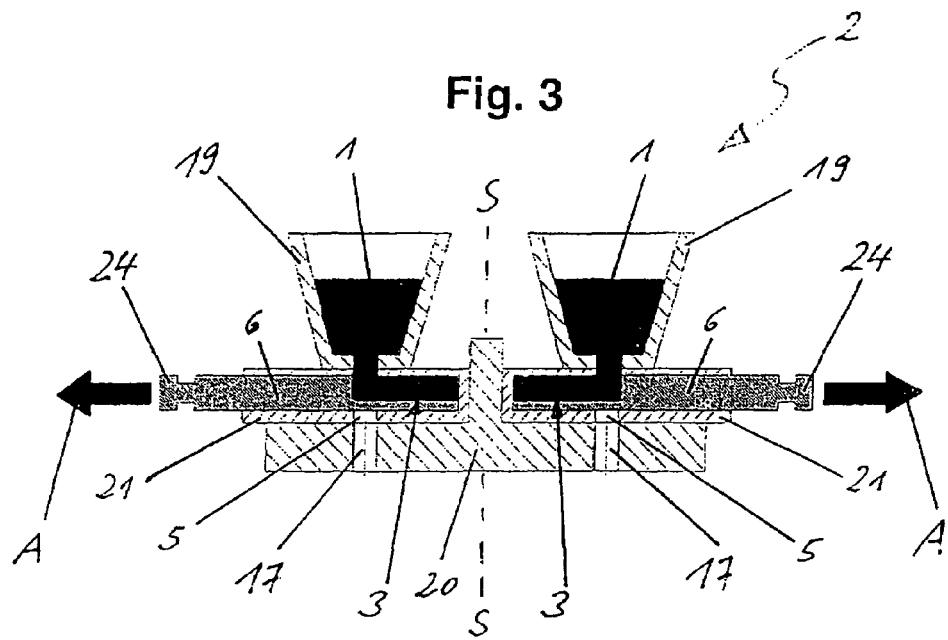
FIG. 3 shows a sectional view of a metering unit according to the invention during the aspiration phase.

The same respective reference numbers were used to denote the matching parts of varying arrangements.

FIG. 1 and FIG. 2 show a symmetrically configured metering unit 2 according to prior art. FIG. 1 shows the part of the metering unit 2 lying to the right of symmetry plane S during the aspiration phase, in which liquid chocolate 1 is siphoned out of a funnel 19. FIG. 2 shows the part of the metering unit 2 lying to the left of the symmetry line S during the metering phase, in which the previously aspirated liquid chocolate 1 is metered into a mold 13. To this end, this known metering unit 2 consists of a casing 20, in which a cylinder casing 21 is embedded. The cylinder casing 21 is interspersed by several parallel reciprocating piston boreholes on the one hand, which each accommodate one reciprocating piston 7, and by two parallel rotating valve boreholes arranged at a right angle relative to the reciprocating piston boreholes on the other, which each incorporate a rotating valve 8 interspersed by valve channels. In the setting of such a rotating valve 8 as shown on FIG. 1, the funnel 19 is connected with the reciprocating piston boreholes, wherein the reciprocating pistons 7 according to arrow A aspirate liquid chocolate 1. In the setting of a rotating valve 8 shown on FIG. 2, the reciprocating piston boreholes are connected with respective casting channels 17, wherein the reciprocating pistons 7 according to arrow B meter in liquid chocolate 1 via the casting channels 17 and a die 11 arranged at the end of each casting channel 17 into a respective alveolus 12 in a mold 13. The aspirating stroke A and metering stroke B of the reciprocating pistons 7 is imparted via a coupling end 24 by means of a reciprocating piston drive (not shown). The piston stroke of the reciprocating pistons 7 is set, for example, using stops or spacers 18 incorporated in the cylinder casing 21, which interact with a guide block 25 that guides several reciprocating pistons 7. The rotating valves 8 are made to turn by a rotating piston drive (also not shown).

Figure 4:
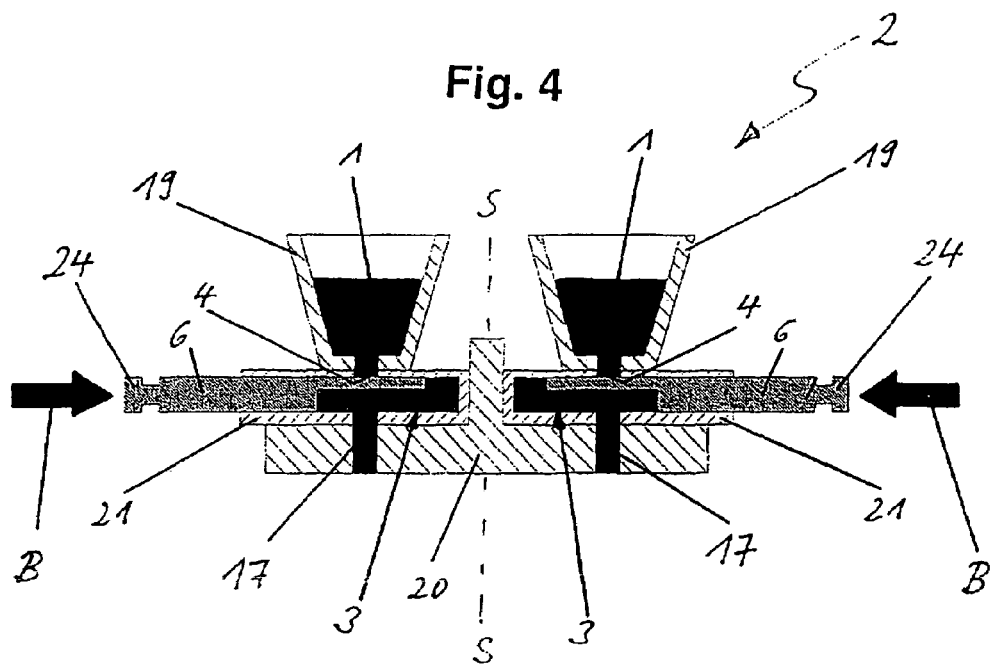
FIG. 4 shows a sectional view of a metering unit according to the invention during the metering phase.

FIG. 3 and FIG. 4 show a side view of a diagrammatically depicted metering unit 2 according to the invention during the aspiration phase (arrow A) or during the metering phase (arrow B). The embodiment of the metering unit 2 according to the invention shown here is also designed symmetrical to a symmetry plane S.

The metering unit 2 consists of a casing 20, with which two symmetrically arranged cylindrical casings 21 are connected. Each of the two cylindrical casings 21 has an inlet opening 4 (see FIG. 4), which connects the cylindrical interior of a cylindrical casing 21 with a funnel 19, as well as an outlet opening 5 (see FIG. 5), which connects the cylindrical interior of a cylindrical casing 21 with a die (not shown) via a casting channel 17. The dies are here designed similarly to prior art, and interact with a mold just as in prior art (see FIG. 1 and FIG. 2).

Situated in the cylindrical interior of each cylindrical casing 21 is a reciprocating/rotating piston 6, the basic shape of which is cylindrical, and the first piston end of which has a recess. The recess of the reciprocating/rotating piston 6 forms a chamber 3 in each cylindrical casing 21. The chamber 3 represents a mold volume that can be enlarged, diminished or shifted by sliding and turning the reciprocating/rotating piston 6. The second piston end of the reciprocating/rotating piston 6 has a coupling end 24, which connects the reciprocating/rotating piston 6 with drive elements (see FIG. 5). The reciprocating/rotating piston or combination piston 6 performs a dual function. By axially shifting the combination piston 6 along its cylindrical axis, the volume of the chamber 3 is either enlarged (arrow A) or diminished (arrow B), thereby resulting in an aspiration function or metering function. Turning the combination piston 6 around its cylindrical axis either opens the inlet opening 4 and simultaneously closes the outlet opening 5 (see FIG. 3), or closes the inlet opening 4 and simultaneously opens the outlet opening 5 (see FIG. 4), thereby resulting in a valve function.

Turning the combination piston here does not change the volume of the chamber 3, since the inner wall of each cylinder casing 21 is in this case shaped like a circular cylinder, which, other than an inlet opening 3 and an outlet opening 5 diametrically opposite does not deviate from the circular cylinder form or have any other recesses. Therefore, the aspirating and metering function imparted by shifting the combination piston 6 is decoupled from the valve function imparted by turning the combination piston 6.

Each combination piston 6 is preferably shifted by means of a servo drive 9 (see FIG. 5). In this case, use can either be made of a linear servo drive that acts on the combination piston 6 along arrows A and B, or a rotative servo drive 9 can be used (as shown on FIG. 5), which acts on the combination piston 6 via a toothed wheel/toothed rack combination (not shown), wherein a gearbox can also be inserted as the force transducer, if needed. The use of a servo drive 9 for the aspirating and metering motion of the combination piston 6 ensures a high level of stiffness and metering accuracy. In addition, the servo drive 9 can be used to comfortably control the time progression for both the aspirating strike (arrow A) and the metering stroke (arrow B). A servo drive can also be used to turn the combination piston 6. However, it is also sufficient to use a relatively simple pneumatic drive for the purpose of turning to open and close the inlet opening 4 and the outlet opening 5, since a high level of stiffness is not required for the drive with respect to the valve function of the combination piston 6, as opposed to the metering function.

A complete movement cycle for the combination piston 6 of the metering unit 2 according to the invention consists of four consecutive partial movements.

In an aspirating stroke, the servo drive (FIG. 5) moves the combination piston 6 out of the cylindrical casing 21 from an initial setting shown on FIG. 3 with the inlet opening 4 open and outlet opening 5 closed over a predetermined distance that defines the metering volume as shown by arrow A. In the process, liquid mass 1 is aspirated out of the funnel 19 into the increasing volume of the chamber 3.

In a first valve switchover that take place after this aspiration stroke has been completed, the combination piston 6 is turned by 180° around its longitudinal axis, so that the combination piston 6 closes the inlet opening 4, and the combination piston 6 opens the outlet opening 5. The now present maximum volume of the chamber 3 here remains unchanged. The position of the chamber 3 is only shifted by the rotational movement. The combination piston 6 is then located in the position shown on FIG. 4. The piston does not rotate 180° in all variants. A smaller rotational angle can also be present in the case of dual-row systems.

In a metering stroke, the servo drive (FIG. 5) moves the combination piston 6 out of the initial setting shown on FIG. 4 with the inlet opening 4 closed and outlet opening 5 open over the predetermined distance that defines the metering volume according to arrow B and into the cylindrical casing 21. In the process, the liquid mass 1 is pumped out of the diminishing volume of the chamber 3 through the casting channel 17 and to the die (not shown).

In a second valve changeover that takes place after this aspiration stroke has been completed, the combination piston 6 is again turned by 180° (other rotational angles are also possible) around its longitudinal axis, so that the combination piston 6 closes the inlet opening 4, and the combination piston 6 opens the outlet opening 5. The now present minimum volume of the chamber 3 here remains unchanged. Only the position of the chamber 3 is shifted. The combination piston 6 is then again in the setting shown on FIG. 3.

The movement cycle of combination piston 6 can now begin anew.

As an alternative, the interior surface of the cylindrical casing 21 can also be provided with recesses, which are situated along the circumferential direction on the inner wall of the cylindrical casing 21 between the inlet opening 4 and the outlet opening 5, and become deeper and deeper with increasing distance from the inlet opening 4 and the outlet opening 5, wherein the greatest depth is found at half the circumferential distance between the inlet opening 4 and the outlet opening 5 at an angular distance of 90°, for example. As a consequence, a rotative aspirating stroke already takes place before the linear aspirating stroke during the rotational movement of the combination piston 6 in the second valve changeover described further above. In other words, the volume in chamber 3 increases not just during the aspirating stroke movement of the combination piston 6, but also during its preceding rotational movement.

Accordingly, the interior surface of the cylindrical casing 21 can also be provided with recesses located along the circumferential direction on the inner wall of the cylindrical casing between the inlet opening 4 and the outlet opening 5, and become flatter and flatter, i.e., less deep, with increasing distance from the inlet opening 4 and the outlet opening 5, wherein the slightest depth is found at half the circumferential distance between the inlet opening 4 and the outlet opening 5 at an angular distance of 90°, for example. As a consequence, a rotative metering stroke already takes place before the linear metering stroke during rotational movement of the combination piston 6 in the first valve changeover described further above. In other words, the volume in chamber 3 decreases not just during the metering stroke movement of the combination piston 6, but also during its preceding rotational movement.

In terms of flow dynamics, the recesses in the inner wall of the cylindrical casing 21 are designed in such a way as to carry a preferably turbulent flow of liquid mass 1, thereby preventing the formation of dead volume.

At a predetermined size of the metering unit 2 according to the invention, this alternative configuration of the cylindrical casing 21 makes it possible to achieve a larger metering quantity per movement cycle of the combination piston 6, or a more compact metering unit 2 and/or shorter linear stroke of the combination piston 6 can be achieved given a predetermined metering quantity. In addition, turbulence is generated, which is advantageous for some casting applications.

Both the linear and rotative motion of the combination piston 6 are then preferably actuated by an electromechanical servo drive.

FIG. 5 shows a diagrammatic perspective view of the entire device according to the invention, including metering unit 2. The metering unit 2 with its two funnels 19 and casing 20 is moveably mounted on a machine rack 22. Incorporated in a respective drive casing 23 on either side of the casing 20 are the toothed wheel/toothed rack combinations, gearboxes or pneumatic elements described further above, which are driven by a respective rotative servo drive 9 for the aspiration stroke and the metering stroke of the combination piston 6, or by a respective pneumatic drive (not shown) for the first and second valve changeover of the combination piston 6. Also provided are three linear servo drives 14, 15, 16, which are used to drive the metering unit 2 with its dies (not shown) along a respective x-direction for a horizontal transverse motion, along the y-direction for a horizontal longitudinal motion, and along the z-direction for a vertical motion. As a result, the dies can be moved on a mold table for dot casting in alveoli 12 of a mold 13 (see FIG. 1 and FIG. 2), if necessary followed by cold stamping, or for linear casting (band casting).

As an alternative, three linear servo drives can be provided, by means of which a mold table (not shown) can be driven along the x-direction, y-direction and z-direction relative to a metering unit 2, which is fixed in this case.

REFERENCE LIST

1 Mass, chocolate
2 Metering unit
3 Chamber
4 Inlet opening
5 Outlet opening
6 Displacement body, reciprocating/rotating piston, combination piston
4, 6 Inlet valve
5, 6 Outlet valve
7 Reciprocating piston
8 Rotating piston
9 Rotative servo drive (for metering volume)
10 Channel (in reciprocating/rotating piston)
11 Die
12 Contact surface, alveolus
13 Mold
14 Linear servo drive (for x-direction)
15 Linear servo drive (for y-direction)
16 Linear servo drive (for z-direction)
17 Casting channel
18 Stop
19 Funnel
20 Casing
21 Cylindrical casing
22 Frame
23 Drive casing
24 Coupling end
25 Guide block
A Arrow for aspiration movement
B Arrow for metering movement
S Symmetry plane

The invention claimed is:

1. A device for processing a consumable in the form of a viscous to pasty mass (1), in particular a consumable based on fat, such as chocolate, or a consumable based on water, such as ice cream, with a metering unit (2) for the metered supply of a specific volume of the mass (1) to molding units (13), wherein the metering unit (2) exhibits a chamber (3) with a sealable inlet opening (4) and a sealable outlet opening (5) for the mass (1) to be metered, as well as a sealed displacement body (6) that extends into the chamber (3) and can move around therein, which can move between a first setting, at which the outlet opening (5) is closed and the inlet opening (4) is open, and the cavity volume defined between the displacement body (6) and the chamber (3) has its greatest value, and a second setting, at which the inlet opening (4) is closed and the outlet opening (5) is open, and the cavity volume defined between the displacement body (6) and the chamber (3) has its smallest value, wherein the inlet opening (4) and the outlet opening (5) can be sealed by means of an inlet valve (4, 6) or an outlet valve (5, 6), wherein the inlet valve (7) and the outlet valve (8) are each formed by a partial area of the displacement body, which only blocks the outlet opening in the first setting, and only blocks the inlet opening in the second setting, and that, in the device, the motion of the displacement body (6) that determines the metering volume is effected by a servo drive (9), while the inlet valve (7) and the outlet valve (8) are each closed and opened via a pneumatic drive.

2. The device according to claim 1, wherein the displacement body is a reciprocating piston (6), which slides axially in the chamber (3) of the metering unit (2), and can be moved back and forth by means of the servo-drive (9) in the chamber (3) between a—first stroke setting in which the cavity volume defined between the reciprocating piston (6) and the chamber (3) has its greatest value, and a second stroke setting in which the cavity volume defined between the reciprocating piston (6) and the chamber (3) has its smallest value.

3. The device according to claim 1 wherein the inlet valve (7) and the outlet valve (8) are formed by a rotating piston (6) that is interspersed with a channel (10), which is rotatably mounted in the chamber (3) of the metering unit, and can be moved back and forth between a first rotation setting and a second rotation setting by means of a drive, wherein the channel (10) establishes a connection between the cavity volume and the inlet opening (4) in the first rotation setting of the rotating piston (6), and establishes a connection between the cavity volume and the outlet opening (5) in the second rotation setting of the rotating piston (6).

4. The device according to claim 1, wherein the displacement body is a reciprocating/rotating piston (6), which axially slides in the chamber (3) and can pivot around its longitudinal axis, wherein the first setting of the reciprocating/rotating piston (6) consists of a first stroke setting and first rotation setting of the reciprocating/rotating piston, while the second setting of the reciprocating/rotating piston (6) consists of a second stroke setting and second rotation setting of the reciprocating/rotating piston.

5. The device according to claim 4, wherein the axial stroke movement of the reciprocating/rotating piston (6) takes place by way of a linear or rotative servo drive (9), while the rotational movement of the reciprocating/rotating piston (6) takes place via a linear or rotative pneumatic drive.

6. The device according to claim 5, wherein the drive for the stroke movement of the reciprocating/rotating piston (6) is a rotating servomotor (9), which is linked with a toothed wheel in a torsionally resistant manner, and generates the axial stroke movement of the reciprocating/rotating piston by means of a toothed rack, which is linked with the reciprocating/rotating piston (6) in an axially rigid manner so that it can rotate in the rotational direction.

7. The device according to claim 6, wherein the drive for the rotational movement of the reciprocating/rotating piston is a linear pneumatic cylinder, with which a toothed rack is rigidly connected, meshing with a toothed wheel connected with the reciprocating/rotating piston in a torsionally resistant manner.

8. The device according to claim 1, wherein the shaping units each contain a die (11), through which the specific volume of mass (1) is conveyed, and a contact surface (12) lying opposite the die (11), which is contacted by the specific volume of mass (1).

9. The device according to claims 8, wherein the contact surface (12) is the inner surface of a mold (13).

10. The device according to claim 8, wherein the contact surface (12) is the upper surface of a mold table, which can be traversed along linearly independent directions (x, y, z) by a respective linear servo-drive.

11. The device according to claim 8, wherein the die (11) is connected by a flexible fluid line to the outlet opening (5) of the metering unit (2), and can be traversed along linearly independent directions (x, y, z) by a respective linear servo-drive (14, 15, 16).

12. The device according to claim 2, wherein the reciprocating/rotating piston (6) exhibits a toothed wheel, and a rotative servo-drive is provided, which drives a toothed rack that meshes with the toothed wheel.

13. The device according to claim 12, wherein it exhibits a plurality of reciprocating/rotating pistons with a respective toothed wheel, wherein the toothed rack driven by the linear servo-drive meshes with several toothed wheels of several reciprocating/rotating pistons.

14. The device according to claim 1, wherein a hygiene wall is provided between the drive area and the product area.

* * * * *